E. V. ALLEN.
AUTOMOBILE FENDER.
APPLICATION FILED APR. 21, 1921.
1,398,957.
Patented Dec. 6, 1921.
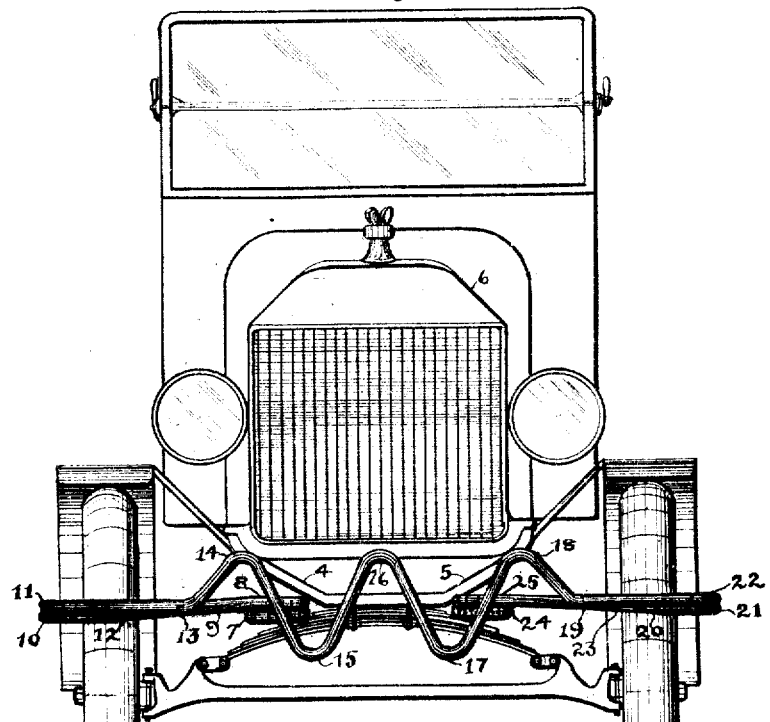
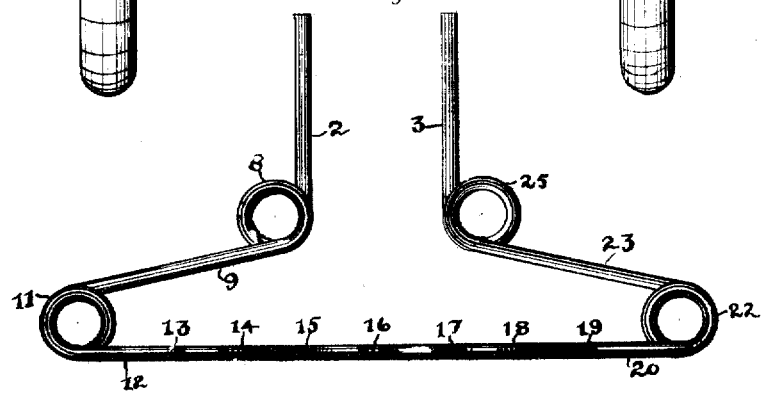
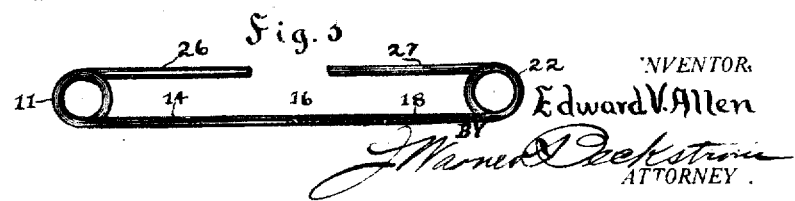
INVENTOR.
Edward V. Allen
ATTORNEY.

UNITED STATES PATENT OFFICE.

EDWARD V. ALLEN, OF WAUKEGAN, ILLINOIS.

AUTOMOBILE-FENDER.

1,398,957.    Specification of Letters Patent.    Patented Dec. 6, 1921.

Application filed April 21, 1921. Serial No. 463,170.

*To all whom it may concern:*

Be it known that I, EDWARD V. ALLEN, a citizen of the United States, residing at Waukegan, Lake county, Illinois, have invented certain new and useful Improvements in Automobile-Fenders, of which the following is a specification.

My invention relates to fenders, bumpers, and the like, for self-propelling vehicles, and its objects are to extend the range of its guard by means of simple and comparatively inexpensive structural formation of a plain metal bar or rod; to increase the fender's protection for both the vehicle and the foot traveler without detracting from the general appearance of the former; to improve the self-adjustability of the fender to the bodies with which it may come in contact; to extend the fender's striking or contacting lines or surfaces both above and below the usual plane of impact without obscuring the front of an automobile, and to provide a fender structure that has a wide range of adaptability to the various forms of automobile structures, and which may be embodied in an indefinite number of ornamental designs or configurations with the aid of the simple bending process applied to a plain rod of more or less flexible metal.

And with the above named general objects in view my invention consists of the novel construction, combination and arrangement of parts, hereinafter described in detail, illustrated in the accompanying drawing and more particularly pointed out in the appended claims.

In the drawing—

Figure 1 is a view of the leading parts of an automobile front with my invention shown in one of its several possible positions applied thereto.

Fig. 2 is a top plan view of the fender alone with its supporting arms or portions arranged closely together.

Fig. 3 is a similar view of a modified and simpler form, shown on a reduced scale.

In Figs. 1 and 2 the rod or bar out of which the fender is formed is shown with a pair of arms or reaches 2 and 3 the lengths of which may be varied according to circumstances. These arms are, for the purpose of the present illustration of this invention, shown in a rather extreme proximate position relative to each other, and one suited for their attachment with the aid of the usual clamps, bolts, straps or other attaching devices (not shown) to some such part intermediate of the sides of the chassis frame as the inclined portions 4 and 5 of a bracket supporting the radiator—6. The more usual practice, however, is to attach the fender to the side rails of the chassis frame, in which event the arms 2 and 3 are spaced farther apart than herein shown.

Continuing outwardly from the arm 2 the rod is formed into a circular spring formed of two or more coils 7 and 8 whence the rod is continued in a straight portion 9 to an end spring coils with turns 10 and 11 similar to 7 and 8. From the coils 10 and 11 the fender proper, or its impact portion, extends across the front of the vehicle in a series of up and down bends which may be extended as far upwardly and downwardly from the horizontal plane of the parts 2 to 11, enumerated, as is desired or may be practicable. A straight leg or run 12 is shown as extending from the coils 10 and 11 to the first vertical bend—13. Then follow in succession a downward bend 14, an upward bend 15, a downward bend 16, an upward bend 17, a downward bend 18 and finally a bend 19 from which extends a short, straight run 20 to a plurality of turns 21 and 22 which are similar to the turns 10 and 11, and, like them, form a rounded end for the fender. The coil 21, 22 terminates in a straight and inclined run or leg 23 leading to a coil consisting of turns 24 and 25 and the arm 3.

In the Fig. 3 construction the coils 7, 8 and 24, 25 and the arms 2 and 3 are omitted, the place of the arms being taken, substantially by the parts 9 and 23 extended parallel to the front portion of the fender and designated as 26 and 27. The latter are also attachable to the bracket 4, 5 or other front frame portion.

While three upward projections, carrying the labelings 14, 16 and 18 are shown their number, as well as the downard projections—15 and 17—may be varied, and they may also be extended to points in front of the wheels.

It will be noticed that these upward and downward curves present an increased number of contact points which tend to diminish the injury liable to be caused by the fender striking a person, and that they do away with the cutting impact of the usual straight bar which delivers its whole blow to only one part of the body. The bends 14 to 18 also yield along the line of movement of a car slightly rotatively on the axis of the parts 12 and 20 to distribute the lines of pressure against a body accidentally struck in the path of the machine.

The forms of the vertical bends may be varied with respect to their appearance and made more artistic than shown in the present illustration of my invention.

I claim as my invention—

1. An automobile fender consisting of a rod or bar formed into a series of spring coils and vertical bends and having its ends secured to the automobile frame.

2. A fender consisting of a rod consisting of a plurality of horizontal turns and bends extending above and below the plane of said turns.

3. An automobile fender consisting of a single rod of metal having rear portions including a series of coils and a front or contact portion with a series of convolutions arranged in substantially a vertical plane.

4. An automobile fender consisting of a single bar or rod metal formed with arms to be attached to the vehicle and with a series of upward and downward turns and end spring coils.

5. A fender having a front or impact portion formed with end coils, upward and downward turns between said coils, rear spring portions and attaching arms.

In testimony whereof I have hereunto signed my name.

EDWARD V. ALLEN.